(12) United States Patent
Coupland et al.

(10) Patent No.: US 8,934,380 B2
(45) Date of Patent: Jan. 13, 2015

(54) METHODS, SYSTEMS, AND COMPUTER READABLE MEDIA FOR SWITCHING OFFICE TRIGGER INDUCTION BY AN INTERMEDIATE SIGNALING NODE

(75) Inventors: Michael Coupland, Belfountain (CA); Amrit Pal Singh Wadwha, Cary, NC (US); Bradley W. Gosnell, Mundelein, IL (US); Venkataramaiah Ravishankar, Cary, NC (US)

(73) Assignee: Tekelec Global, Inc., Morrisville, NC (US)

( * ) Notice: Subject to any disclaimer, the term of this patent is extended or adjusted under 35 U.S.C. 154(b) by 627 days.

(21) Appl. No.: 12/902,548

(22) Filed: Oct. 12, 2010

(65) Prior Publication Data

US 2011/0110274 A1     May 12, 2011

Related U.S. Application Data

(60) Provisional application No. 61/250,463, filed on Oct. 9, 2009.

(51) Int. Cl.
*H04L 12/16*     (2006.01)
*H04M 3/22*     (2006.01)
*H04Q 3/00*     (2006.01)
*H04L 29/06*     (2006.01)

(52) U.S. Cl.
CPC ............ *H04M 3/2281* (2013.01); *H04Q 3/0029* (2013.01); *H04L 65/1069* (2013.01); *H04L 65/1096* (2013.01); *H04M 2207/12* (2013.01)
USPC ......................................................... 370/259

(58) Field of Classification Search
None
See application file for complete search history.

(56) References Cited

U.S. PATENT DOCUMENTS

| | | | |
|---|---|---|---|
| 5,923,744 A * | 7/1999 | Cheng | 379/221.09 |
| 6,504,907 B1 | 1/2003 | Farris et al. | |
| 6,810,243 B2 * | 10/2004 | Torabi | 455/417 |
| 7,171,265 B2 | 1/2007 | Hoium et al. | |
| 7,912,486 B2 | 3/2011 | Bantukul et al. | |
| 2002/0009973 A1 | 1/2002 | Bondy et al. | |
| 2002/0184527 A1 | 12/2002 | Chun et al. | |

(Continued)

FOREIGN PATENT DOCUMENTS

| | | |
|---|---|---|
| WO | WO 02/093838 A1 | 11/2002 |
| WO | WO 2004/091250 A1 | 10/2004 |
| WO | WO 2006/105099 A2 | 10/2006 |

OTHER PUBLICATIONS

U.S. Appl. No. 61/220,560, filed Jun. 25, 2009.

(Continued)

*Primary Examiner* — Minh-Trang Nguyen
(74) *Attorney, Agent, or Firm* — Jenkins, Wilson, Taylor & Hunt, P.A.

(57) ABSTRACT

Methods, systems, and computer readable media for inducing the activation of a service trigger at a switching office in a communications network are disclosed. According to one method, a call setup message associated with a call is received. It is then determined whether service trigger induction is required for the call. In response to determining that service trigger induction is required for the call, the call setup message is modified to include service trigger induction information and the modified call setup message is directed to a destination switching office. At the destination switching office, a service trigger is activated based on the service trigger induction information in the modified call setup message.

25 Claims, 7 Drawing Sheets

(56) References Cited

U.S. PATENT DOCUMENTS

| | | | |
|---|---|---|---|
| 2004/0228362 A1 | 11/2004 | Maki et al. |
| 2006/0217136 A1 | 9/2006 | Bantukul et al. |
| 2008/0057915 A1 | 3/2008 | Lahtiranta et al. |
| 2008/0318545 A1 | 12/2008 | Kazmi |
| 2010/0029248 A1 | 2/2010 | Shi et al. |
| 2011/0086628 A1 | 4/2011 | Karuturi et al. |

OTHER PUBLICATIONS

"Intelligent Network (IN)," http://www.iec.org, pp. 1-32 (Publication Date Unknown).

"3GPP Architecture Evolution Towards Flat Architecture," EFORT, pp. 94-114 (Publication Date Unknown).

"LTE/SAE Target Architecture," EFORT, p. 90 (Publication Date Unknown).

Non-Final Official Action for U.S. Appl. No. 12/903,147 (Aug. 15, 2012).

Decision of Rejection for Chinese Patent Application No. 200680018579.8 (Sep. 29, 2012).

Communication Pursuant to Article 94(3) for European Patent Application No. 06 748 812.2 (Mar. 27, 2012).

Third Office Action for Chinese Patent Application No. 200680018579.8 (Mar. 1, 2012).

Second Office Action for Chinese Patent Application No. 200680018579.8 (Aug. 28, 2011).

European Search Report for European Patent Application No. 06 748 812.2 (Feb. 25, 2011).

Office Action for Chinese Patent Application No. 200680018579.8 (Dec. 3, 2010).

Notice of Allowance and Fee(s) Due for U.S. Appl. No. 11/202,929 (Nov. 12, 2010).

Decision on Appeal for U.S. Appl. No. 11/202,929 (Jun. 1, 2010).

Board of Patent Appeals and Interferences Docketing Notice for U.S. Appl. No. 11/202,929 (May 15, 2009).

Interview Summary for U.S. Appl. No. 11/202,929 (Nov. 24, 2008).

Examiner's Answer for U.S. Appl. No. 11/202,929 (Sep. 22, 2008).

Examiner's Answer for U.S. Appl. No. 11/202,929 (Jul. 21, 2008).

Notification of Non-Compliant Appeal Brief for U.S. Appl. No. 11/202,929 (Apr. 16, 2008).

Notice of Panel Decision from Pre-Appeal Brief Review for U.S. Appl. No. 11/202,929 (Dec. 17, 2007).

Final Official Action for U.S. Appl. No. 11/202,929 (Jul. 11, 2007).

Notification of Transmittal of the International Search Report and the Written Opinion of the International Searching Authority, or the Delcaration for International Application No. PCT/US2006/011301 (Apr. 30, 2007).

Official Action for U.S. Appl. No. 11/202,929 (Nov. 20, 2006).

Third Generation Partnership Project, "Technical Specification Group Services and System Aspects; 3G security; Lawful interception architecture and functions (Release 6)," 3GPP TS 33.107, v6.1.0 (Dec. 2003).

Rosenberg et al., "SIP: Session Initiation Protocol," Network Working Group, RFC 3261 (Jun. 2002).

"Telecommunications Security; Lawful Telecommunications Traffic (LI); Handover Interface for the Lawful Interception of Telecommunications Traffic," ETSI ES 201 671, Edition 2, Draft 12 (Jan. 8, 2001).

Office Action for Indian Patent Application No. 4800/CHENP/2007 (Mar. 18, 2013).

Final Office Action for U.S. Appl. No. 12/903,147 (Jan. 16, 2013).

\* cited by examiner

METHODS, SYSTEMS, AND COMPUTER READABLE MEDIA FOR SWITCHING OFFICE TRIGGER INDUCTION BY AN INTERMEDIATE SIGNALING NODE

PRIORITY CLAIM

This application claims the benefit of U.S. Provisional Patent Application Ser. No. 61/250,463 filed Oct. 9, 2009; the disclosure of which is incorporated herein by reference in its entirety.

TECHNICAL FIELD

The subject matter described herein relates to reducing the administrative overhead associated with activating intelligent network (IN)/advanced intelligent network (AIN) service triggers at a switching office. More specifically, the subject matter relates to methods, systems, and computer readable media for switching office trigger induction by an intermediate signaling node.

BACKGROUND

Service triggers associated with a subscriber may be set at a switching office and can include originating call attempt triggers, terminating call attempt triggers, and various other types of service triggers. These triggers may be fired/activated at a switching office based on an attribute of the call (e.g., inbound, outbound), the called or calling party associated with the call/call attempt, or other call attributes that are well known to those of skill in the art.

The switching office (e.g., a service switching function (SSF) or service switching point (SSP)) acts as the trigger point for further services to be invoked during a call. The SSP implements the basic call state machine (BCSM) which is a finite state machine representing an abstract view of a call from beginning to end (off hook, dialing, answer, no answer, busy, hang up, etc.). As each state is traversed, the exchange encounters detection points (DPs) at which the SSP may invoke a query to the SCP to wait for further instructions on how to proceed. Trigger criteria are defined by the operator and might include the subscriber calling number or the dialed number. The SSF is responsible for entertaining calls requiring value added services.

The call model is a generic representation of SSP call-processing activities required to establish, maintain, and clear a basic call. The call model consists of point in calls (PICs), detection points (DPs), and triggers. PICs represent the normal switching system activities or states that a call goes through from origination to termination. For example, the null state or the idle state is when the SSP is actually monitoring the customer's line. Other examples of states, or PICs, are off-hook (or origination attempt), collecting information, analyzing information, routing, alerting, etc. In the AIN call model, trigger detection points (TDPs) are located between the PICs and SSPs are configured to check TDPs to see if there are any active triggers.

There are three types of triggers: subscribed or line-based triggers, group-based triggers, and office-based triggers. Subscribed triggers are provisioned to the customer's line so that any calls originating from or terminating to that line would encounter the trigger. Group-based triggers are assigned to groups of subscribers. Any member of a software-defined group will encounter the trigger. Office-based triggers are available to everyone who is connected to the telephone switching office or has access to the North American numbering plan. Office-based triggers are not assigned to individuals or groups.

If an active trigger is detected, normal switching system call processing is suspended until the SSP and SCP complete communications. For example, in the diagram above, suppose an AIN call has progressed through the null state or the off-hook PIC and is currently at the collecting-information PIC. Normal call processing is suspended at the information-collected TDP because of an active off-hook delayed trigger. Before progressing to the next PIC, the SSP may assemble an information-collected message and send it to the SCP over the SS7 network. After SCP service logic acts on the message, the SCP may send an analyze-route message that tells the SSP how to handle the call before going to the next PIC (analyze information). Essentially, when the SSP recognizes that a call has an associated AIN trigger, the SSP suspends the call processing while querying the SCP for call routing instructions. Once the SCP provides the instruction, the SSP continues the call model flow until completion of the call.

One problem associated with conventional trigger activation is that each switching office in the network has to be provisioned and maintained with a current, up-to-date list of all subscribers subject to a particular service in order to determine and effectively communicate to whom the service should be applied. This can result in an undesirably high administrative burden on the part of network operators.

Accordingly, in light of these difficulties, a need exists for reducing the administrative overhead associated with activating IN/AIN service triggers at a switching office without requiring that the switching office be provisioned and maintained with a current, up-to-date list of all subscribers subject to a particular IN/AIN service.

SUMMARY

Methods, systems, and computer readable media for inducing the activation of a service trigger at a switching office by an intermediate signaling node in a communications network are disclosed. According to one method, a call setup message associated with a call is received and it is determined whether service trigger induction is required for the call. In response to determining that service trigger induction is required for the call, the call setup message is modified to include service trigger induction information and the modified call setup message is directed to a destination switching office. At the destination switching office, a service trigger is activated based on the service trigger induction information in the modified call setup message.

A system for inducing the activation of a service trigger at a switching office by an intermediate signaling node in a communications network is also disclosed. The system includes a trigger inducing function (TIF) screening module for receiving a call setup message associated with a call and for determining whether service trigger induction is required for the call. In response to determining that service trigger induction is required for the call, the TIF screening module also modifies the call setup message to include service trigger induction information and directs the modified call setup message to a destination switching office. The destination switching office is configured to activate a service trigger based on the service trigger induction information located in the modified call setup message.

The subject matter described herein for inducing the activation of a service trigger at a switching office in a communications network may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. The subject matter excludes embodiments composed entirely of software or transitory signals. In addition, a computer readable medium that implements the subject matter described herein may be located on a single computing platform or may be located on plural computing platforms.

BRIEF DESCRIPTION OF THE DRAWINGS

The subject matter described herein will now be explained with reference to the accompanying drawings of which.

DETAILED DESCRIPTION

The subject matter described herein discloses a system and method for modifying the contents of a call setup signaling message in order to induce a switching office to activate a service trigger upon receiving the modified call setup message for an IN/AIN trigger that has been previously provisioned on the switch. As a result, one advantage is that each switching office in the network does not have to be provisioned and maintained with a current, up-to-date list of all subscribers subject to a particular service. Instead, switches need only support the logic necessary to facilitate/support the service.

Figure 1:
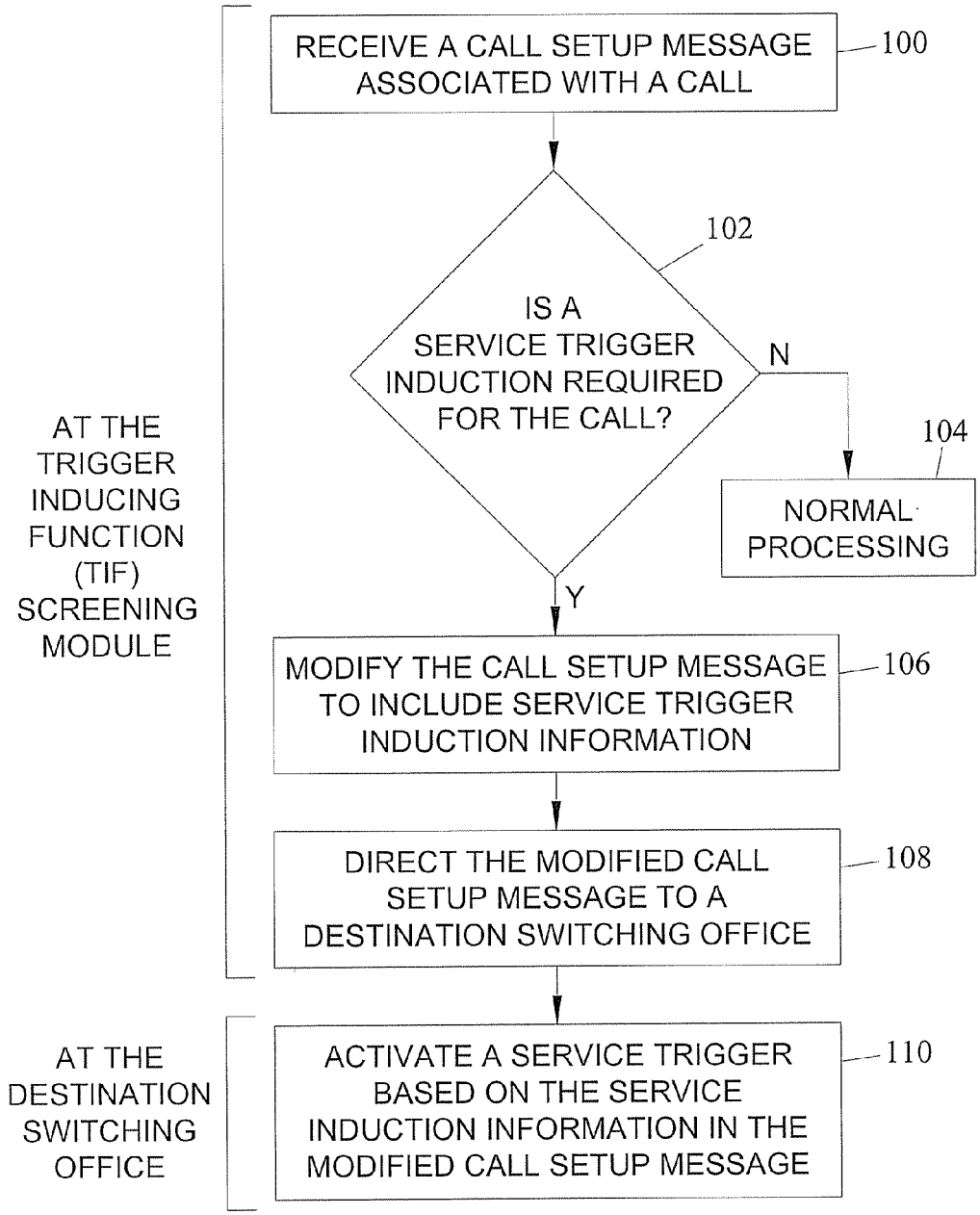
FIG. 1 is a flow chart illustrating exemplary steps for performing switching office trigger induction by an intermediate signaling node according to an embodiment of the subject matter described herein.

FIG. 1 is a flow chart illustrating exemplary steps for performing switching office trigger induction by an intermediate signaling node according to an embodiment of the subject matter described herein. Referring to FIG. 1, in step 100, a call setup message associated with a call may be received. For example, in an SS7 network, a TIF screening module associated with an STP may intercept an ISDN user part (ISUP) initial address message (IAM) message. Alternatively, in a session initiation protocol (SIP) network, the TIF screening module may be associated with a SIP signaling router (SSR) and intercept a SIP Invite message.

In step 102, it may be determined whether service trigger induction is required for the call. For example, the TIF screening module may consult a trigger induction (TID) rules database in order to obtain triggering information by performing a lookup using information contained in the received call setup message. The information used for the lookup may include information such as called party number, calling party number, circuit identification code (CIC), etc. If an entry is located in the TID rules database, thereby indicating that service trigger induction is required for the call, the TID may be retrieved from the TID rules database for use in step 104.

In step 104, in response to determining that service trigger induction is required for the call, the call setup message is modified to include the service trigger induction information determined in step 102. For example, TID may be inserted, pre-pended, post-pended, etc. to either the IAM or Invite message.

In step 106, the modified call setup message is directed to a destination switching office. This may include forwarding the modified call setup message to the destination switching office or to a next hop network node so that it may be routed to the destination switching office.

In step 108, a service trigger at the destination switching office is activated. For example, the switching office may examine the modified call setup message and, upon examining the included TID, the switching office may activate a trigger. It is appreciated that the switching may already be configured to activate a service trigger and, therefore, the activation of the trigger may be induced by an intermediate signaling node (e.g., the STP or SSR) without requiring that the switching office be provisioned and maintained with a current, up-to-date list of all subscribers subject to a particular IN/AIN service.

Various SS7-based embodiments for performing switching office trigger induction by an intermediate signaling node will now be described in greater detail below. It will be appreciated that while SS7-based examples are shown in the figures, the same forced triggering mechanism may be implemented in a SIP network without departing from the scope of the subject matter described herein. For example, a TID DB could be implemented at a SIP routing node (e.g., SSR) or, in the case of an IMS network, the switch would be implemented at a call session control function (CSCF) node. Service triggers could then be set such that the CSCF could be used in a manner similar to the IN/AIN triggers shown in the figures that follow.

Figure 2:
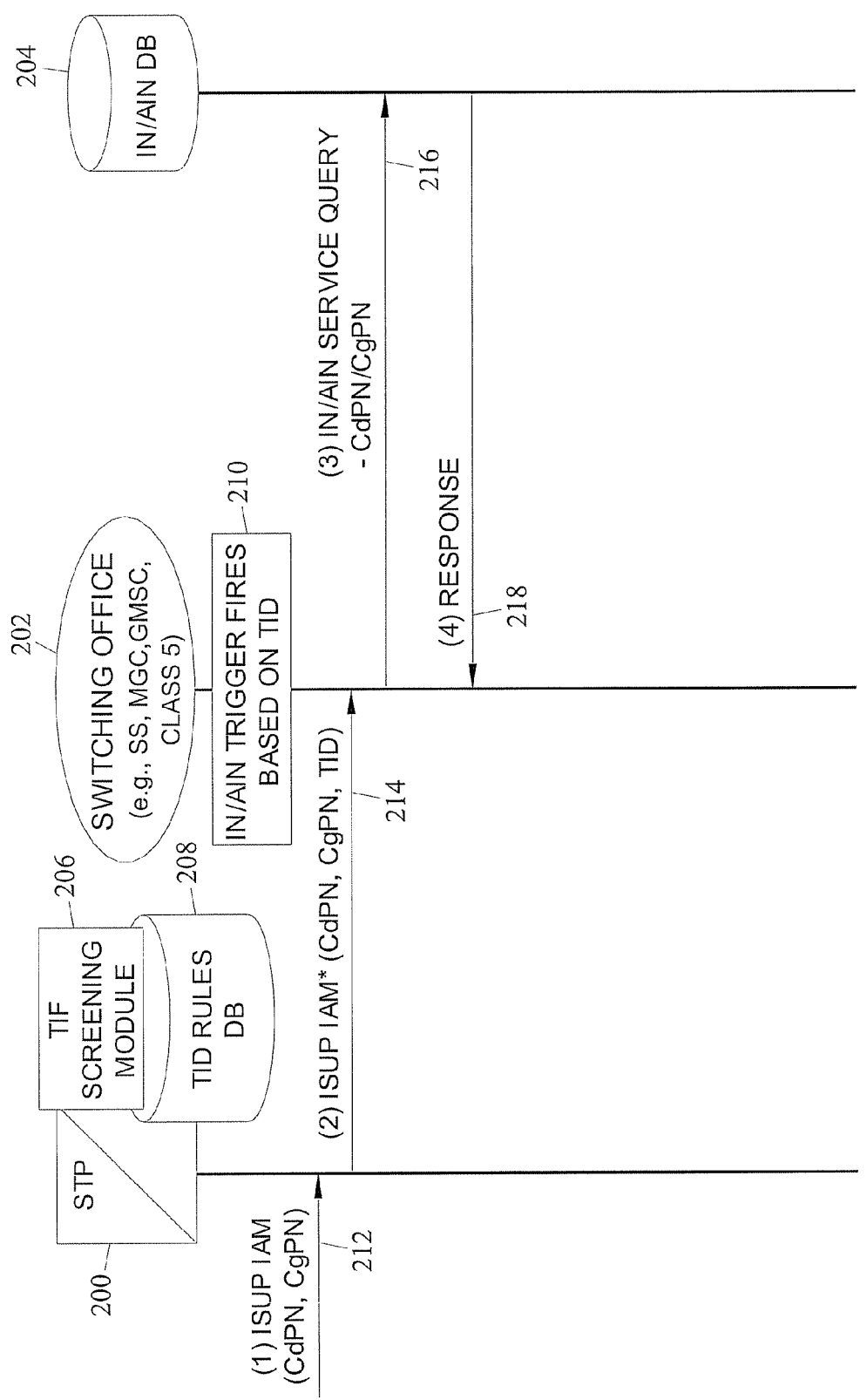
FIG. 2 is a message sequence diagram illustrating an exemplary network for performing switching office trigger induction by an intermediate signaling node according to an embodiment of the subject matter described herein.

FIG. 2 is a message sequence diagram illustrating an exemplary SS7 network for performing switching office trigger induction by an intermediate signaling node according to an embodiment of the subject matter described herein. Referring to FIG. 2, the basis for many SS7 communications network includes signal transfer points (STPs), switching offices, and IN/AIN DBs. An STP is a router that relays SS7 messages between signaling end-points (SEPs) and other STPs. A switching office/SEP is a specialized network node for processing TDM-based, circuit-switched telephone calls and is connected directly to customer equipment. A switching office, such as a "Class 5 switch," "TDM switch," media gateway controller (MGC), gateway mobile switching center (GMSC), CSCF, or SIP server (SS) handles services such as call forwarding and call waiting. As used herein, a SIP server refers to any middle server, such as a registrar server (which accepts REGISTER requests and handles local services in its domain), or a proxy server (which acts as both a user agent client (UAC) and a user agent server (UAS) for generating requests/responses on the behalf of other UAs). An IN/AIN DB is a computer system having a database for storing customer-specific information used by the network to route calls or provide other IN/AIN services by responding to queries directed to the DB. These services can include area number calling service, disaster recovery service, do not disturb service, and 5-digit extension dialing service. For example, FIG. 2 includes exemplary network components STP 200, switching office 202, and IN/AIN DB 204.

In addition to these network elements, various components or modules may also be included and either associated with, separately located from, co-located with, or integrated with existing components for providing switching office trigger induction by an intermediate signaling node. For example, TIF screening module 206 may be associated with STP 200 for screening call setup messages based on one or more TID rules and for modifying call setup messages to include service trigger induction information (e.g., inserting one or more trigger induction digits into the call setup message) in order to induce activation of a trigger by an intermediate signaling node. TIF screening module 206 may also be associated with TID rules DB 208 for storing trigger induction information such as one or more TIDs and their associated call/caller-related information. Next, switching office 202 may be associated with IN/AIN trigger files 210 for examining the modified call setup message and, upon seeing the included TID, automatically activating (i.e., being induced to fire) a service trigger.

STP 200 may be adapted to include a trigger inducing function (TIF) module 206, where TIF screening module 206 is adapted to screen a call setup message based on one or more TID rules 208. Exemplary TIF/TID screening rules 208 may include a called party number (CdPN), calling party number (CgPN), circuit identification code (CIC), originating point code (OPC), destination point code (DPC), time of day, day of week, or other criteria. If TIF screening module 206 determines that trigger induction processing is indicated based on the provisioned TID rules, then TIF screening module 206 may insert one or more trigger induction digits (TIDs) into call setup message 212. TID(s) may be pre- or post-pended to an existing parameter value in the call setup message, or alternatively, TID(s) may be inserted as a new parameter value in a previously non-populated or non-existing parameter in the call setup message.

In the embodiment shown in FIG. 2, an exemplary message sequence is illustrated. The sequence may begin by receiving, at STP 200, an ISUP IAM including (among other information) a CdPN and a CgPN.

Modified call setup message 214, which now includes one or more TID(s), may then be routed directly to or towards (i.e., using intermediate hops) a destination switching office such as switching office 202. Destination switching office 202 may then examine the TID(s) included in message 214 and, at step 210, the TID(s) may cause switching office 210 to fire/activate a trigger. It is appreciated that the activated trigger has been set on switch 202 such that, in the absence of the TID(s) received in modified call setup message 214, the trigger would not have otherwise been fired/activated. In one example, the firing/activating of the trigger in step 210 may cause switching office 202 to send a query to an SCP or SCP-like node to obtain a service for the call. This scenario is shown in FIG. 2 where switching office 202 generates and sends IN/AIN service query 216 to IN/AIN DB 204 and receives response 218 in return.

In the embodiment shown in FIG. 2, TIF screening module 206 may intercept ISUP IAM 212 which includes CdPN and CgPN identifiers. TID rules DB 208 may be provisioned with subscriber identifiers (e.g., POTS, MSISDN, URI, etc.) that have been associated with an IN/AIN service (See Table 1). Based on the CdPN or CgPN, TIF screening module 206 may determine whether the CdPN or CgPN is associated with an IN/AIN service. If one or both has been provisioned for a service, then TIF screening module 206 may modify ISUP IAM message 202 to include triggering information (e.g., prefix digits, an additional parameter value, etc.). Modified ISUP IAM message 214, which includes the TID, may then be routed to or towards the next switching office (e.g., gateway switch, terminating switch, etc.) such as switching office 202. Switch 202 may then receive modified ISUP IAM message 214, extract the TID, and fire an IN/AIN trigger based on, at least in part, the TID. In example shown in FIG. 2, the IN/AIN trigger fired in step 210 may be a trigger that has been set to handle/accommodate the IN/AIN service.

TABLE 1

Exemplary TIF/TID Rules

| CdPN | CgPN | TID |
|---|---|---|
| 9194605500 | — | 999 |
| — | 9193803814 | 666 |

Figure 3:
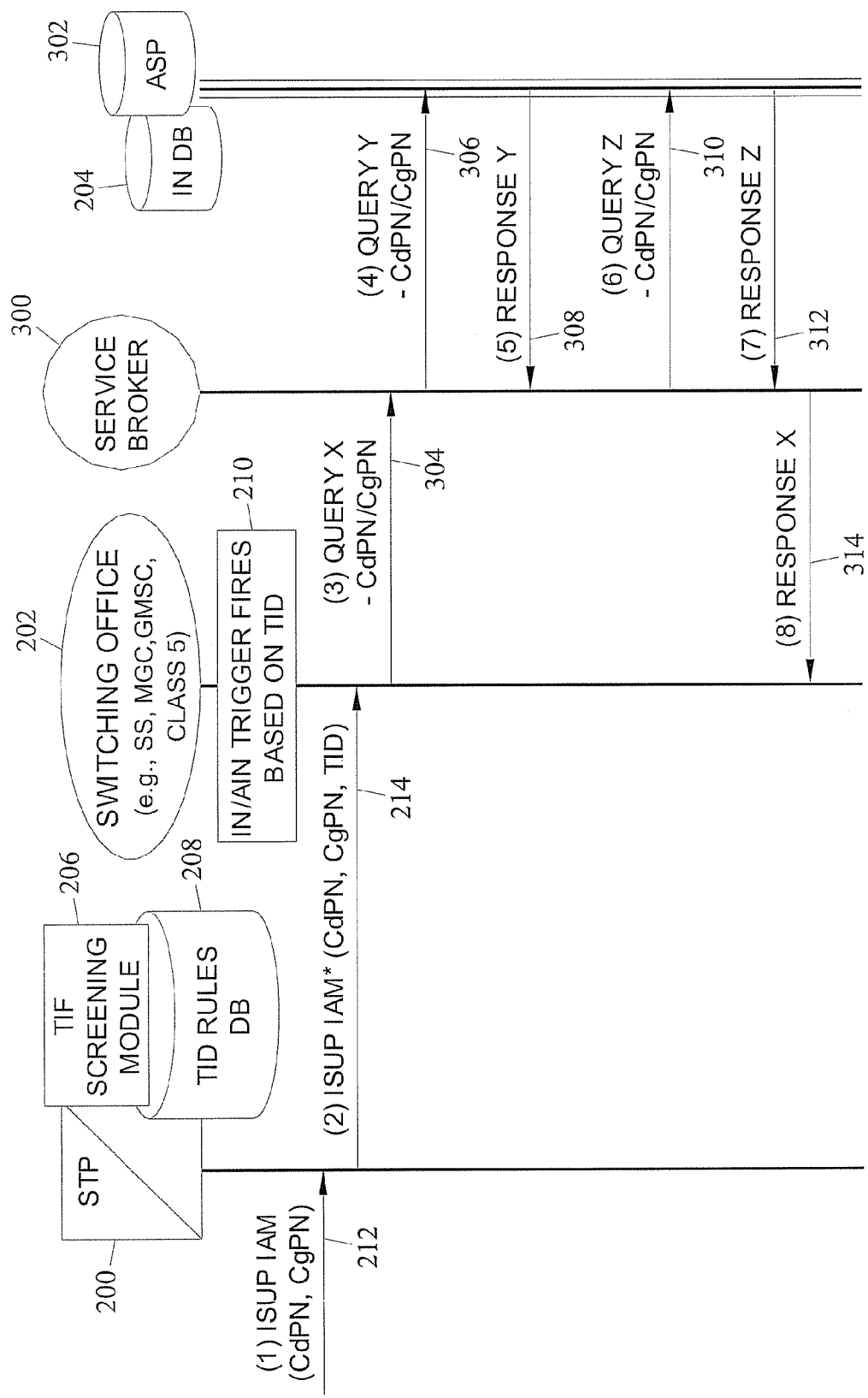
FIG. 3 is a message sequence diagram illustrating an exemplary service broker scenario for performing switching office trigger induction by an intermediate signaling node according to an embodiment of the subject matter described herein.

FIG. 3 is a message sequence diagram illustrating an exemplary service broker scenario for performing switching office trigger induction by an intermediate signaling node according to an embodiment of the subject matter described herein. One example of hardware suitable for implementing switching office trigger induction by an intermediate signaling node includes the Tekelec service capability interaction manager (hereinafter, "TekSCIM") platform produced by Tekelec, Inc. of Calabasas, Calif.

In the service broker implementation shown in FIG. 3, TIF screening module 206 may intercept an ISUP IAM message that includes CdPN and CgPN identifiers. TID rules DB 208 may be provisioned with subscriber identifiers (e.g., POTS, MSISDN, URI, etc.) that have been associated with a service which is provided/facilitated by service broker 300. Based on the CdPN or CgPN, TIF screening module 206 may determine whether the CdPN or CgPN is associated with a service broker facilitated service. If one or both has been provisioned for a service, then TIF screening module 206 may modify ISUP IAM message 212 to include triggering information (e.g., prefix digits, an additional parameter value, etc.). Modified ISUP IAM message 214 (which includes the TID information) may then be routed to or towards the next switching office (e.g., gateway switch, terminating switch, etc.). Switch 202 may receive modified ISUP IAM message 214, extract the TID, and fire an IN/AIN trigger based, at least in part, on the TID. In this example, the activated IN/AIN trigger may be set to initiate a transaction with the service broker.

A service broker is a telecommunications device (e.g., a standalone network node) that mediates between the 3rd party applications and real-time communication service enablers for providing carrier-grade service interaction and mediation capabilities for enabling service interaction across diverse network types and orchestrates multiple services in real-time.

Switch 202 may, for example, launch query 304 to service broker 300 to request a particular service or services. Service broker 300 may receive and analyze query 304 and subsequently initiate one or more query transactions to one or more SCPs, database servers, application servers, etc. in order to obtain the requested service. For example, in response to receiving query X 304, service broker 300 may generate and forward query Y 306 to IN DB 204/ASP 302 and await a response. After receiving response Y 308, service broker may generate and forward query Z 310 to IN DB 204/ASP 302 and await a response message. Service broker 300 may then respond to querying switching office 202 with information associated/for providing with the requested service. For example, upon receiving response Z 312, service broker may respond to switching office 202 with response Z 314.

Figure 4:
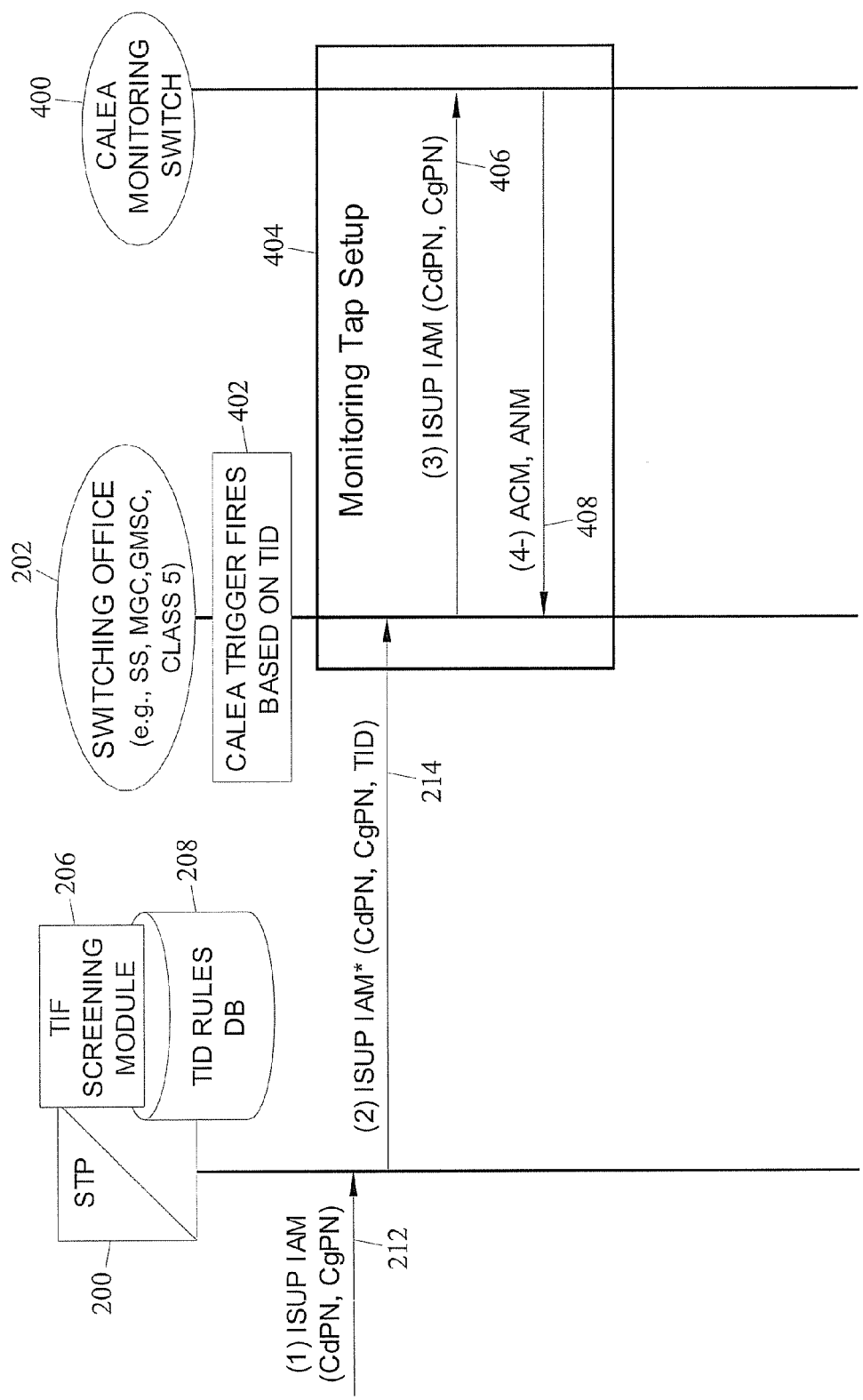
FIG. 4 is a message sequence and network diagram illustrating inducing activation of a commission on accreditation for law enforcement (CALEA)/surveillance services trigger in a telecommunications networking environment according to an embodiment of the subject matter described herein.

FIG. 4 is a message sequence and network diagram illustrating inducing activation of a commission on accreditation for law enforcement (CALEA)/surveillance services trigger in a telecommunications networking environment according to an embodiment of the subject matter described herein. In this sample implementation, TIF screening module 206 intercepts ISUP IAM 212 that includes CdPN and CgPN identifiers. TID rules DB 208 may be provisioned with subscriber identifiers (e.g., POTS, MSISDN, URI, etc.) that have been placed under CALEA surveillance. Based on the CdPN or CgPN, TIF screening module 206 may determine whether the CdPN or CgPN is under CALEA surveillance. If either is currently under surveillance, then TIF screening module 206 may modify ISUP IAM message 212 to include triggering information (e.g., prefix digits, an additional parameter value, etc.). Modified ISUP IAM message 214 (which includes the TID information) may then be routed to (or towards) the next switching office (e.g., gateway switch, terminating switch, etc.). Switch 202 may then receive modified ISUP IAM message 214, extract the TID, and fire an IN/AIN trigger based on, at least in part, the TID. In this example, the IN/AIN trigger that fires may be a trigger that has been set to handle/accommodate calls that require CALEA monitoring.

One advantage of the embodiment shown in FIG. 4 is that each switching office in the network does not have to be provisioned and maintained with a current, up-to-date list of all subscribers subject to CALEA surveillance. Instead, switches need only support the logic necessary to facilitate/support the CALEA surveillance mechanism. To whom the CALEA surveillance mechanism should be applied may be determined and effectively communicated to the switch by the STP/TIF function. As a result, CALEA system operation for a carrier may be greatly simplified from an administrative perspective.

Figure 5:
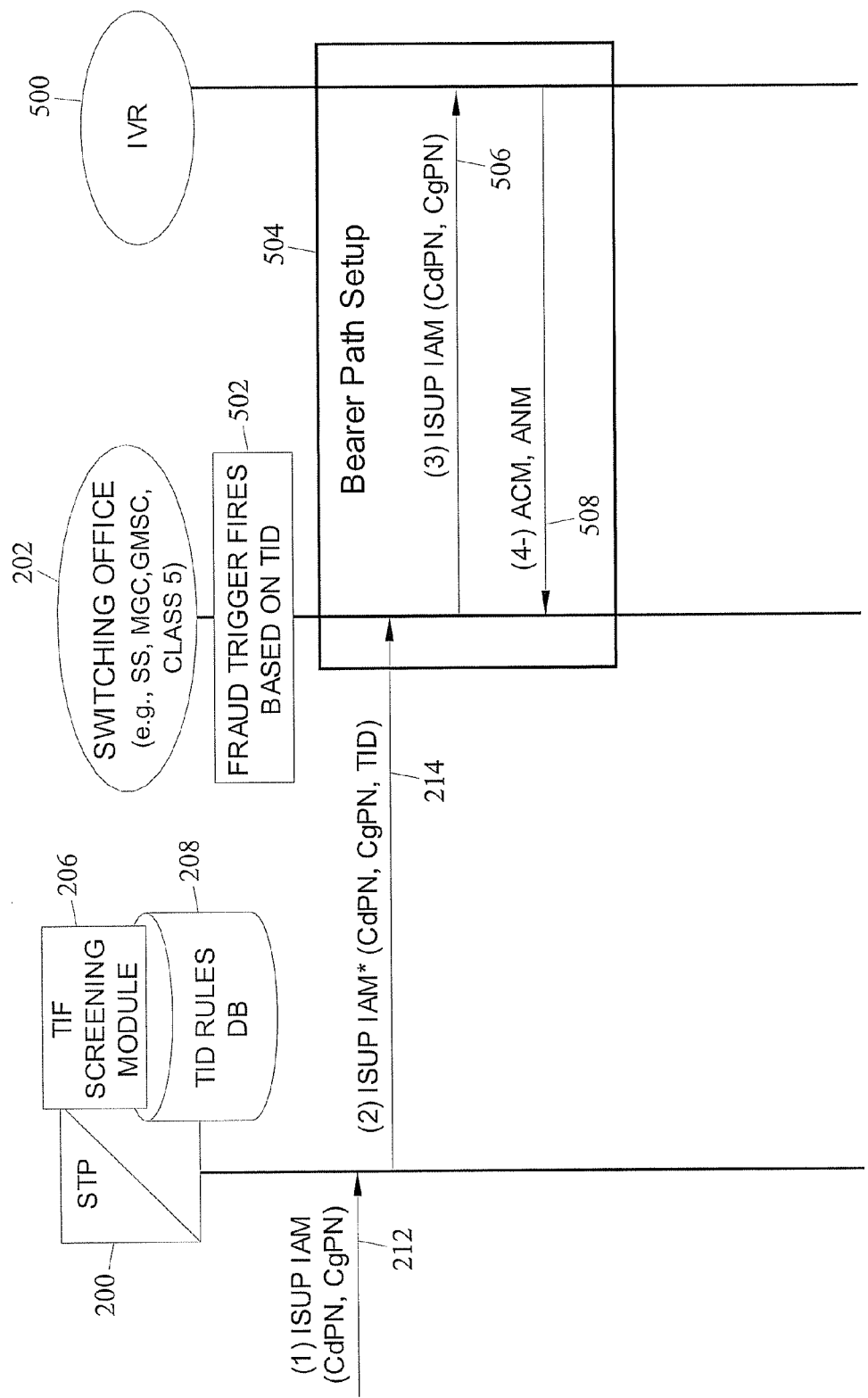
FIG. 5 is a message sequence and network diagram illustrating inducing activation of a fraud detection and mitigation services trigger in a telecommunications networking environment according to an embodiment of the subject matter described herein.

FIG. 5 is a message sequence and network diagram illustrating inducing activation of a fraud detection and mitigation services trigger in a telecommunications networking environment according to an embodiment of the subject matter described herein. Referring to FIG. 5, TIF screening module 206 may intercept ISUP IAM 212 that includes CdPN and CgPN identifiers. TID rules DB 208 may be provisioned with subscriber identifiers (e.g., POTS, MSISDN, URI, etc.) that are known/suspected of fraudulent activity. Based on the CdPN or CgPN, TIF screening module 206 may determine whether the CdPN or CgPN is on the fraud blacklist. If either is currently on the fraud blacklist, then TIF screening module 206 may modify ISUP IAM message 212 to include triggering information (e.g., prefix digits, an additional parameter value, etc.). In this example, as in the previous examples, the triggering information may be a TID. Modified ISUP IAM message 214 (which includes the TID information) may then be routed to (or towards) the next switching office (e.g., gateway switch, terminating switch, etc.). Switch 202 may then receive modified ISUP IAM message 214, extract the TID, and fire an IN/AIN trigger based, at least in part, on the TID.

In this example, the IN/AIN trigger that fires may be a trigger that has been set to invoke an IVR to solicit confirmation from the calling party prior to attempting to complete setup of the call. For example, in step 502, switching office 202 may activate, in step 502, a fraud service trigger based on the TID in modified message 214. Switching office 202 may then initiate bearer path setup 504 with IVR 500. This may include, among other signaling details, sending ISUP IAM message 506 to ICR 500 and receiving an acknowledgment message (ACM)/answer message (ANM) 508 in return.

Figure 6:
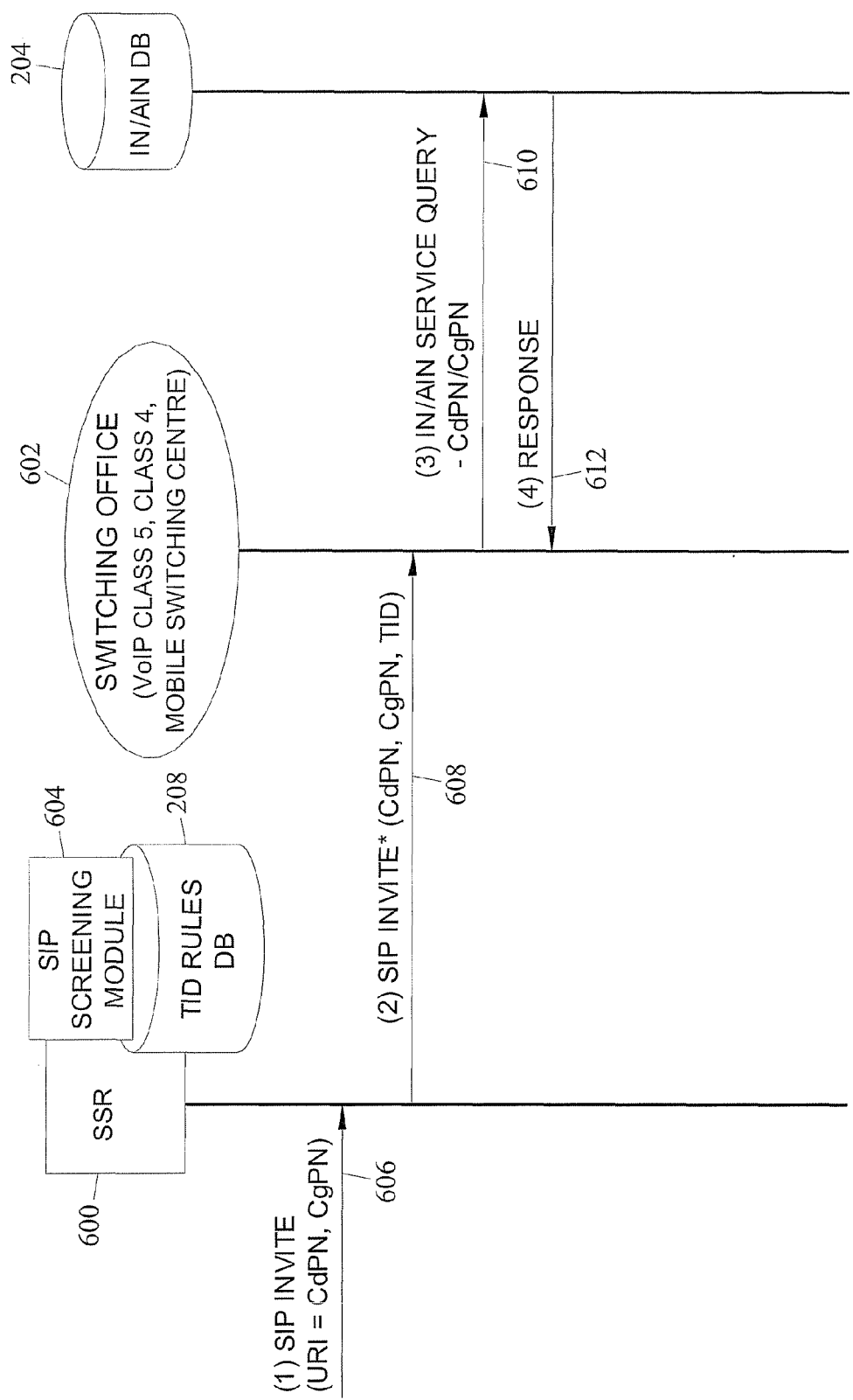
FIG. 6 is a message sequence and network diagram illustrating an exemplary SIP network for performing switching office trigger induction by an intermediate SIP signaling node according to an embodiment of the subject matter described herein.

FIG. 6 is a message sequence and network diagram illustrating an exemplary SIP network for performing switching office trigger induction by an intermediate SIP signaling node according to an embodiment of the subject matter described herein.

In the embodiment illustrated in FIG. 6, SIP signaling router 600 may be adapted to include SIP TIF screening module 604 adapted to screen a SIP call setup message based on one or more TID rules stored in TID rules DB 208. Exemplary TID rules may be based on SIP sending party, SIP receiving party, time of day, day of week, or other criteria. If TIF screening module 604 determines that trigger induction processing is indicated based on the provisioned TID rules, then TIF screening module 604 may insert one or more TIDs into the SIP call setup message, such as SIP Invite message 606. The TID(s) may be pre- or post-pended to an existing parameter value in SIP call setup message 606, or alternatively, the TID(s) may be inserted as a new parameter value in a previously non-populated or non-existing parameter in SIP call setup message 606 in order to generate modified SIP Invite message 608.

Modified SIP Invite message 608 (which now includes one or more TID(s)) may then be routed directly to or towards (i.e., using intermediate hops) a destination switching office such as switching office 602. Destination switching office 602 may then examine the TID(s) included in message 608 and the TID(s) may cause switching office 602 to fire/activate a trigger. Switching office 602 may also update modified SIP Invite message 608 with source data. It is appreciated that the activated trigger may be set on switch 602 such that, in the absence of the TID(s) received in modified call setup message 608, the trigger would not have otherwise been fired/activated. In one example, the firing/activating of the trigger may cause switching office 602 to send an IN/AIN query to an SCP or SCP-like node to obtain a service for the call. For example, switching office 602 may generate and send IN/AIN service query message 610 to IN/AIN DB 204 and receive response message 612 in return.

Figure 7:
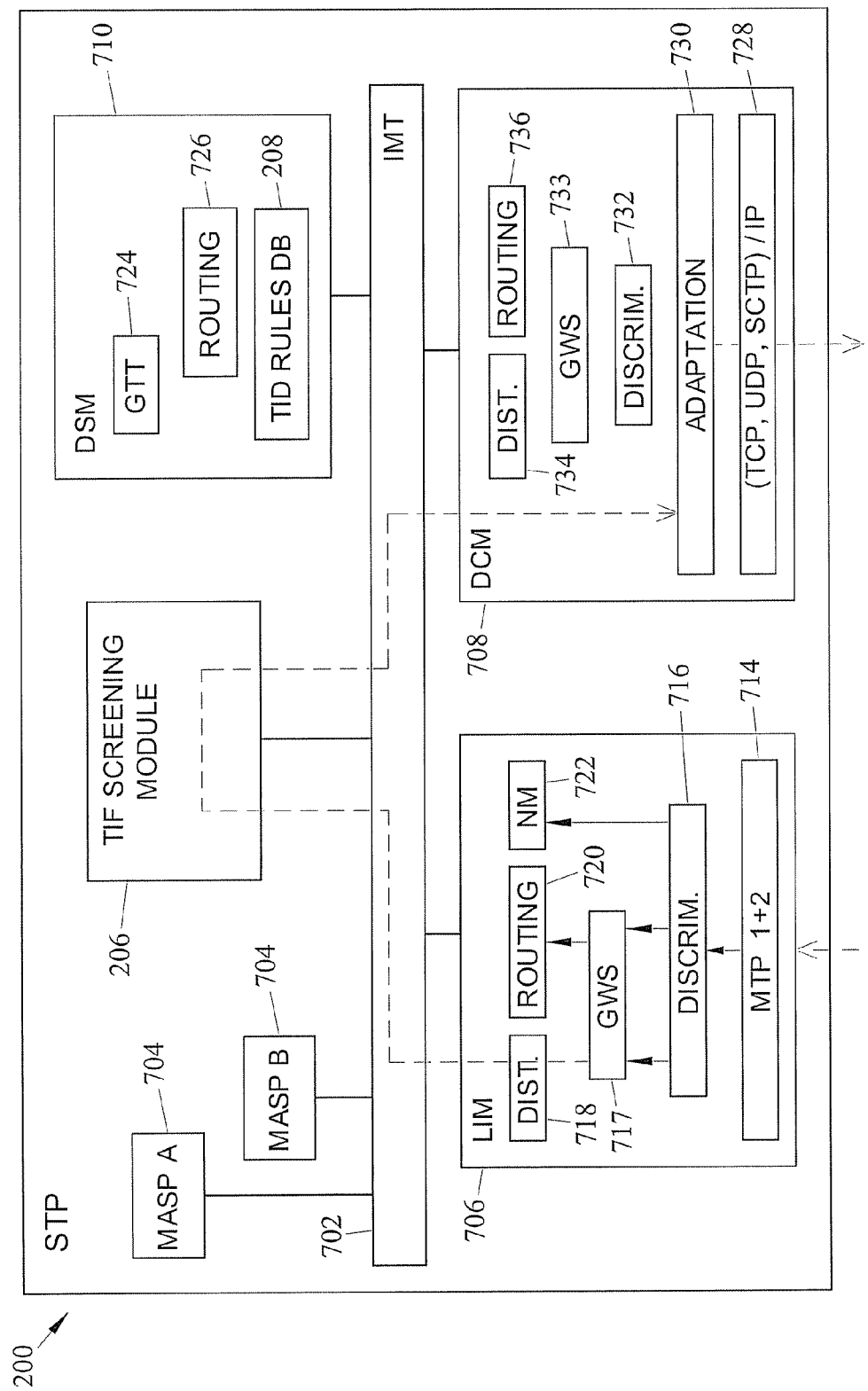
FIG. 7 is block diagram of an exemplary signaling transfer point (STP) including a screening module for performing switching office service trigger induction according to an embodiment of the subject matter described herein.

FIG. 7 is block diagram of an exemplary signaling transfer point (STP) including a screening module to identify application processing sequences for screening of signaling messages at applications according to an embodiment of the subject matter described herein. In FIG. 7, STP 200 includes a high speed inter-processor message transport (IMT) communications bus 702. A number of distributed processing modules or cards may be coupled to IMT bus 702. In FIG. 7, these processing modules or cards include a pair of maintenance and administration subsystem processors (MASP) 704, an SS7 link interface module (LIM) 706, an IP-capable data communication module (DCM) 708, a database services module (DSM) 710, and a TIF screening module 712. These modules may be physically connected to the IMT bus 702 such that signaling and other types of messages may be routed internally between active cards or modules. The distributed, multi-processor architecture of STP 200 facilitates the deployment of multiple LIM, DCM, DSM and other cards, all of which may be simultaneously connected to and communicating via IMT bus 702.

MASP pair 704 implement the maintenance and administration subsystem functions described above. As MASP pair 704 are not particularly relevant to a discussion of the switching office trigger induction by an intermediate signaling node of the present invention, a detailed discussion of their function is not provided herein.

LIM 706 interfaces with one or more external signaling links. LIM 706 may have a number of sub-components. In FIG. 7, these sub-components include an SS7 MTP level 1 & 2 function 714, an SS7 MTP level 3 layer message discrimination function 716, a gateway screening (GWS) function 717, message distribution function 718, a routing function 720, and a signaling network management (NM) function 722.

MTP level 1 and 2 function 714 provides the facilities necessary to send and receive digital data over a particular physical medium, as well as to provide error detection, error correction and sequenced delivery of SS7 messages. Message discrimination function 716 receives signaling messages from the lower processing layers and performs a discrimination function that effectively determines whether an incoming SS7 message requires internal processing or is simply to be through switched. Examples of received SS7 messages that require internal processing include signaling connection control part messages in need of global title translation and signaling network management messages.

For SCCP messages that require GTT processing by database services module 710, message distribution function 718 may receive such messages from discrimination function 716 and direct the messages to database services module 710 via IMT bus 702. This type of internal distribution of messages within the STP node should not be confused with message routing, which refers to selecting an external signaling link over which a received message should be forwarded.

TID rules DB 208 may be provisioned with subscriber identifiers (e.g., POTS, MSISDN, URI, etc.) that have been associated with an IN/AIN service (See Table 1). Based on the CdPN or CgPN, TIF screening module 206 may determine whether the CdPN or CgPN is associated with an IN/AIN service. If one or both has been provisioned for a service, then TIF screening module 206 may modify ISUP IAM message 202 to include triggering information (e.g., prefix digits, an additional parameter value, etc.).

Gateway screening function 717 may examine one or more parameters and signaling message and determine whether to allow the signaling message to pass into a network. Conventional parameters examined by a gateway screening function include the destination point code of a received signaling message. According to one implementation of the subject matter described herein, gateway screening function 717 may examine one or parameters of received ISUP messages to determine eligibility for processing by screening module 712 and by the associated applications. For example, as described above, if a redirection parameter and a received ISUP message corresponds to voicemail, gateway screening function 717 may forward the message to routing function 720 for routing, rather than to screening module 712 for further processing.

In order to identify messages as candidates for screening by screening module 712, discrimination function 716 and/or gateway screening function 717 may first determine whether the messages are the type that require such screening. For example, discrimination function 716 or gateway screening function 717 may identify ISUP, SIP, TCAP, or other message types as candidates for screen by screening module 712. Discrimination function 716 or gateway screening function 717 may forward such messages to distribution module 718. Distribution module 718 may forward the messages to screening module 412 for further screening.

Routing function 720 is responsible for examining an incoming message and determining on which outbound linkset and link the message is to be transmitted. For example, routing function 720 may examine a destination point code in a received message, and perform a lookup in an MTP level 3 route table to select a route to the destination point code. Once route selection is made, routing function 720 ensures that the message is directed internally to the appropriate communication module (e.g., SS7 LIM, IP DCM, ATM high speed link (HSL), etc.) for outbound transmission.

MTP level 3 signaling network management function 722 may receive, process, and generate messages associated with the management and administration of an SS7 signaling network. NM function 722 may selectively communicate network management information to adjacent signaling points, so as to prevent the unwarranted sending of network management messages to nodes that are not affected by network failures.

As illustrated in FIG. 7, database services module 710 includes a global title translation (GTT) function 724 and a routing function 726. If GTT processing is needed, GTT function 724 may be used to translate digits present in a signaling, message (e.g., an 800 number) to destination point codes (DPCs) and subsystem numbers (SSNs) to allow routing of these messages to the final destination. Routing function 726 performs the same routing functions as those described above with respect to routing function 720. Once this determination is made, routing function 726 ensures that the message is directed internally to the appropriate communication module (e.g., SS7 LIM, IP DCM, ATM HSL, etc.) for outbound transmission.

TIF screening module 712 may implement functions related to performing switching office trigger induction by an intermediate signaling node, as discussed above. Specifically, TIF screening module 712 may be adapted to receive a call setup message associated with a call and determine whether service trigger induction is required for the call. TIF screening module 712 may also be adapted to modify call setup messages to include service trigger induction information in response to determining that service trigger induction is required for a call and to direct the modified call setup message to a destination switching office.

DCM 708 includes an IP transport function 728, a signaling protocol adaptation function 730, a discrimination function 732, a gateway screening function 733, a distribution function 734, and a routing function 736. IP transport function 728 includes hardware and software for implementing OSI layers 1-3. For example, IP transport function may implement a physical layer protocol, such as Ethernet, a network layer protocol, such as IP, and a transport layer protocol, such as transmission control protocol (TCP), user datagram protocol (UDP), and/or stream control transmission protocol (SCTP). Adaptation function 730 may receive a signaling message from an IP network that is formatted according to a first signaling protocol (e.g., M3UA, SUA, M2PA, TALI or other IP adaptation layer protocol), and adapt or reformat the message into a second signaling protocol (e.g., MTP). Adaptation function 730 may also receive a signaling message, such as a SIP message, and translate the SIP message into an equivalent SS7 or SS7-adaptation protocol message, and vice-versa. These adaptation and translation processing operations may be performed on in-bound and out-bound signaling messages. Adaptation function 730 may also receive outbound SS7 messages from other modules in STP 200 and modify the messages for transport over the IP network according to the appropriate signaling transport or other IP adaptation layer protocol.

Discrimination function 732 performs discrimination operations similar to those described above with respect to discrimination function 716. In addition to the SS7 and SS7-adaptation protocol discrimination parameters described above, discrimination function 732 may also examine received SIP message parameters including a To parameter, a From parameter, a Via parameter, a source IP address parameter, a destination IP address parameter, and others. Discrimination based on these parameters enables function 732 to determine whether screening or internal processing is required. According to one embodiment, discrimination function 732 may copy a received signaling message, such that the original message may be routed to the target destination and the message copy may be processed by one or more processing subsystems associated with STP 200.

Gateway screening function 733 may perform operations similar to gateway screening function 717 to determine eligibility for screening of received messages by screening module 712. For example, gateway screening function 733 may analyze one or more parameters and receive ISUP messages to determine whether the ISUP messages are eligible for screening. If messages are eligible for screening, gateway screening function 733 and/or discrimination function 732 may forward such messages to distribution function 734. Distribution function 734 may forward such messages to screening module 712 for screening.

Distribution function 734 handles the internal routing of message packets that require additional processing prior to final routing. Such messages may include signaling messages associated with message service messages such as SMS, MMS, and IM services (e.g., SIP INFO message, SIP message, SIP INVITE message, etc.), as well as mobility management messages. Routing function 736 is adapted to access network routing rule information, which may include SS7 and IP network routing rules, and apply these routing rules to messages that require routing.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for inducing the activation of a service trigger at a switching office in a communications network, the method comprising:
   at an intermediate node separate from an origination or destination switching office:
   receiving, from the origination switching office, a call setup message associated with a call;
   determining whether service trigger induction is required for the call;
   in response to determining that service trigger induction is required for the call, modifying the call setup message to include service trigger induction information in the call setup message;
   directing the modified call setup message to the destination switching office; and
   at the destination switching office, activating a service trigger based on the service trigger induction information in the modified call setup message.

2. The method of claim 1 wherein receiving a call setup message includes receiving one of a session initiation protocol (SIP) Invite message and an ISDN user part (ISUP) initial address message (IAM) message.

3. The method of claim 2 wherein the call setup message includes at least one of a called party number (CdPN), a calling party number (CgPN), a circuit identification code (CIC).

4. The method of claim 1 wherein receiving a call setup message includes intercepting a call setup message at a trigger inducing function (TIF) screening module associated with one of: a signal transfer point (STP) and a SIP signaling router (SSR).

5. The method of claim 1 wherein determining whether service trigger induction is required includes consulting one or more screening rules.

6. The method of claim 5 wherein consulting one or more rules includes performing a lookup based on at least one of: a called party number (CdPN), a calling party number (CgPN), and a circuit identification code (CIC) in order to obtain a triggering identifier (TID).

7. The method of claim 5 wherein the one or more screening rules include one or more of a session initiation protocol (SIP) sending party, SIP receiving party, time of day, and day of week.

8. The method of claim 1 wherein modifying the call setup message includes pre-pending to an existing parameter value in SIP call setup message, post-pending to an existing parameter value in SIP call setup message, inserting as a new parameter value in a previously non-populated parameter in SIP call setup message, or inserting as a new parameter value in a previously non-existing parameter in SIP call setup message.

9. The method of claim 1 wherein directing the modified call setup message to a destination switching office includes forwarding the modified call setup message directly to the destination switching office or forwarding the modified call setup message to an intermediate next hop network communications node in the direction of the destination switching office.

10. The method of claim 1 wherein activating a service trigger includes activating a trigger that has been set to process calls that require one of: commission on accreditation for law enforcement (CALEA) services, surveillance services, fraud detection, fraud mitigation, and service broker.

11. The method of claim 1 wherein activating a service trigger includes generating an intelligent network (IN)/advanced intelligent network (AIN) query message.

12. The method of claim 1 wherein activating a service trigger is performed by one of a (SS), media gateway controller (MGC), gateway mobile switching center (GMSC), class 5 switch, call session control function (CSCF).

13. A system for inducing the firing of a service trigger at a switching office in a communications network, the system comprising:
   a trigger inducing function (TIF) screening module at an intermediate node separate from an origination or destination switching office, the TIF screening module for:
   receiving, from the origination switching office, a call setup message associated with a call;
   determining whether service trigger induction is required for the call;
   modifying the call setup message to include service trigger induction information in the call setup message in response to determining that service trigger induction is required for the call; and directing the modified call setup message to the destination switching office; and the destination switching office for activating a service trigger based on the service trigger induction information in the modified call setup message.

14. The system of claim 13 wherein the TIF screening module is configured receive one of a session initiation protocol (SIP) Invite message and an ISDN user part (ISUP) initial address message (IAM) message.

15. The system of claim 13 wherein the TIF screening module is configured to intercept at least one of a called party number (CdPN), a calling party number (CgPN), a circuit identification code (CIC).

16. The system of claim 13 wherein the TIF screening module is associated with one of: a signal transfer point (STP) and a SIP signaling point (SSR).

17. The system of claim 13 wherein the TIF screening module is configured to consult one or more screening rules.

18. The system of claim 13 wherein the TIF screening module is configured to perform a lookup based on at least one of: a called party number (CdPN), a calling party number (CgPN), and a circuit identification code (CIC) in order to obtain a triggering identifier (TID).

19. The system of claim 13 wherein the one or more screening rules include at least one of a session initiation protocol (SIP) sending party, SIP receiving party, time of day, and day of week.

20. The system of claim 13 wherein the TIF screening module is configured to pre-pend the TID to an existing parameter value in SIP call setup message, post-pend the TID to an existing parameter value in SIP call setup message, insert the TID as a new parameter value in a previously non-populated parameter in SIP call setup message, or insert the TID as a new parameter value in a previously non-existing parameter in SIP call setup message.

21. The system of claim 13 wherein the TIF screening module is configured to forwarding the modified call setup message directly to the destination switching office or forward the modified call setup message to an intermediate next hop network communications node in the direction of the destination switching office.

22. The system of claim 13 wherein the TIF screening module is configured to activate a trigger that has been set to process calls that require one of: commission on accreditation for law enforcement (CALEA) services, surveillance services, fraud detection, fraud mitigation, and service broker.

23. The system of claim 13 wherein the switching office is configured to generate an intelligent network (IN)/advanced intelligent network (AIN) query message in response to activating the service trigger.

24. The system of claim 13 wherein the service trigger is activated by one of a SIP server (SS), media gateway controller (MGC), gateway mobile switching center (GMSC), class 5 switch, and call session control function (CSCF).

25. A non-transitory computer readable medium comprising computer executable instructions embodied in the non-transitory computer readable medium and when executed by a processor of a computer performs steps comprising:

at an intermediate node separate from an origination or destination switching office:

receiving, from the origination switching office, a call setup message associated with a call;

determining whether service trigger induction is required for the call;

in response to determining that service trigger induction is required for the call, modifying the call setup message to include service trigger induction information in the call setup message;

directing the modified call setup message to the destination switching office; and at the destination switching office, activating a service trigger based on the service trigger induction information in the modified call setup message.

* * * * *